Patented Mar. 2, 1948

2,436,970

UNITED STATES PATENT OFFICE 2,436,970

FERROUS METAL SUPPORTED ZINC OXIDE-BISMUTH OXIDE CATALYST

Vincent F. Mistretta, Fanwood, N. J., assignor to Standard Oil Development Company, a corporation of Delaware No Drawing. Application December 28, 1944, Serial No. 570,211

6 Claims. (Cl. 252—214)

The present invention relates to improved catalysts and more particularly to improved dehydrogenation catalysts in reactions involving compounds having the formula

RR'CHOH where R may be an alkyl, aryl, alkaryl, aralkyl or cycloalkyl radical and R' can be hydrogen or an alkyl, aryl, aralkyl, alkaryl or cycloalkyl radical such as methyl, ethyl, propyl, etc.; phenyl; benzyl, etc.; methyl, phenyl and cyclohexyl, as for instance the dehydrogenation of secondary alcohols with the aid of a catalyst under appropriate operating conditions of temperature, feed rate and pressure to form the corresponding ketones.

It is well known that the dehydrogenation of primary and secondary alcohols to the corresponding aldehydes and ketones may be affected by passing the alcohols at elevated temperatures over substances acting as dehydrogenation catalysts. The first catalysts employed in this field were metals such as copper, brass, etc. High operating temperatures and short catalyst life were the chief disadvantages of these metals when used in this connection. Later, zinc oxide, cerium oxide, magnesium oxide and other difficultly reducible oxides were used to advantage and gave good yields of products. Combinations of catalytic metals and difficultly reducible oxides have also been suggested. Difficultly reducible oxides have a dehydrating as well as dehydrogenation effect which causes a reduction in the overall yield of desired products due to the regeneration of olefin from the alcohols. For the purpose of suppressing and controlling these undesirable side reactions, alkali and alkaline earth metal carbonates, hydroxides and oxides, etc., have been used in conjunction with the difficultly reducible oxide catalyst. However the use of these additives has given rise to other disadvantages for the reason that they decrease the thermal stability and life of the difficultly reducible oxide catalyst as well as make such catalysts more susceptible to poison.

Recently it has been found that the activity of difficultly reducible oxides as dehydrogenation catalysts, can be markedly improved by the addition thereto of bismuth oxide, $Bi_2O_3$. The principal disadvantage of oxide catalysts generally is that in practice they require a carrier or catalyst support in order to obtain adequate contact between the catalyst and the reactant. In known methods of preparation and usage considerable quantities of the oxide coating are "dusted off" of the catalyst support during preparation of the catalyst and also in subsequent operational usage. This results in reduced catalyst life and loss of catalyst thereby increasing labor and material cost considerably. In an attempt to prevent this condition it has been suggested that adhesive agents be incorporated with the catalyst to bind the catalyst to its support. The adhesive compounds usually employed are alkali carbonates, hydroxides or silicates, etc., and as such decrease the activity of the catalytic oxide. Furthermore, certain metal supports such as brass, fuse readily at temperatures slightly above those required for dehydrogenation. It is therefore readily apparent that the known materials used as carriers or catalyst supports for dehydrogenation catalysts leave much to be desired.

The principal object of the present invention is the provision of a difficultly reducible oxide catalyst coated on a carrier or catalyst support with a bonding agent or material integral with the support. Another object is to improve the catalyst life thermal stability of difficultly reducible oxide catalysts. These and other objects will be apparent to those skilled in the art upon reading the following description.

These objects are accomplished by the present invention, which in its general aspect comprises a catalytic material composed of a catalytic oxide deposited upon a metal which is capable of easily forming a porous oxide film which film acts as a bonding agent forming a firm bond between the surface of the metal and the catalytic oxide deposited thereon. The metals which have been found to form such porous oxide films are iron and ferrous alloys. Under actual conditions of use the metals are employed in the form of turnings, chips, filings or any other form providing a large surface area per unit of mass. Alloys of the metal may be used provided that care is taken not to use an alloying element which renders the alloy substantially impervious to atmospheric oxidation. An instance of the latter type of alloy is the iron-chromium alloys containing 12 or more per cent of chromium which place these alloys in the stainless category.

The catalyst coating is composed of the difficultly reducible oxide such as zinc oxide, cerium oxide or magnesium oxide or mixtures of these, and it is also contemplated that these difficultly reducible oxide catalysts may be mixed with other oxides to yield a membered type of catalyst. A particularly effective dehydrogenation catalyst, in reactions involving compounds having the formula $RR'CHOH$ where R may be an alkyl, aryl, alkaryl, aralkyl or cycloalkyl radical and R' can be hydrogen or an alkyl, aryl, aralkyl, alkaryl or cycloalkyl radical such as methyl, ethyl, propyl, etc.; phenyl; benzyl, etc.; methyl, phenyl or cyclohexyl, is a mixture of zinc oxide containing from 1-6% of bismuth oxide, $Bi_2O_3$, based upon the weight of zinc oxide used. In the preparation of this catalyst it is preferred to mix the two oxides in the proper proportions in powdered form, then work in enough water to make a heavy slurry of the oxides, the slurry to be about the consistency of heavy cream. This will ordinarily require a volume of water approximately equivalent to the volume of powder used. This catalyst slurry is then in condition to be coated on a carrier.

Alternative procedures now present themselves for coating the catalyst on the carrier. The metal may first be subjected to humid conditions capable of promoting rapid oxidation such as maintaining the metal in a water spray chamber at 100° F. until a coating of oxide has formed, then remove the oxidized metal and place it in a tumbling machine along with the catalyst slurry and tumble until a uniform coating of catalyst over the catalyst support is obtained. For this purpose it is customary to supply about 3 to 6 pounds of catalyst or 5 to 12 pounds of catalyst slurry per 100 pounds of metal. The preferred procedure is to put the catalyst support or carrier in a tumbling mechanism, pour the catalyst slurry over the carrier and then tumble until a uniform coating is secured. In this procedure the moisture from the catalyst slurry is depended upon to promote the formation of the porous oxide film over the surface of the support. The formation of the porous oxide film on the surface of the support can be further assisted by air-blowing if desired. The catalyst support coated with catalyst is then placed in an oven at 80° C. and dried. The drying step generally requires from 24-48 hours. The catalyst is then ready for use. A modified form of the preferred procedure is to charge the catalyst support on the carrier directly from the tumbling machine to the reaction chamber. The time interval while the converter is being brought up to reaction temperature is sufficient to permit the formation of the oxide bonding agent.

The formation of methyl ethyl ketone from secondary butyl alcohol provides an example of the manner in which the catalysts of the present invention may be utilized. The conversion of secondary alcohols to ketones is accomplished by passing the alcohol in vapor form through a catalyst packed tube heated to the temperature of from 350-500° C. at a pressure of from about 1-3 atmospheres and a feed or feed rate of from .5-10 volumes of liquid alcohol per volume of catalyst per hour. The vapors are then passed to a condenser where the ketone and unreacted alcohol are condensed from the not readily condensible gases consisting predominantly of hydrogen and a small amount of, ordinarily not more than 1%, regenerated olefin.

Having outlined the general principles of the invention, the following examples, which are included merely for purposes of illustration and not as a limitation, of the conversion of secondary butyl alcohol to methyl ethyl ketone run under the conditions indicated in these examples, graphically demonstrate the superiority of the present catalyst carrier as a support for oxide catalysts with respect to activity at high throughput, thermal stability and longer life. It has been determined by visual inspection, that catalytic oxides when coated upon a catalyst support in accordance with the method of the present invention are firmly imbedded within the surface of the porous oxide film on the metal carrier. When supported in this way the catalyst oxide does not readily "dust off." It has been noted that when catalysts are prepared using brass or granular pumice as the catalyst support, a large layer of catalyst will be found in the bottom of the drying oven where it has been deposited after flaking off of the catalyst support. Also when the catalyst is moved from the drying oven to the conversion chamber a considerable volume of dust appears around both the drying oven and over the port in the conversion chamber.

CATALYST ACTIVITY

*Example I*

[Temperature=400° C.—2#/sq. in.]

| | | | |
|---|---|---|---|
| Catalytic oxides | | $ZnO-Bi_2O_3$ | |
| Support | Brass | Brass | Steel. |
| Adhesive agent | $Na_2CO_3$ | 0 | 0. |
| Per cent conversions at— | | | |
| 1.5 v./v./hr | 90.4 | 98.0 | 96.0. |
| 6.0 v./v./hr | 58.0 | 92.0 | 93.0. |
| Catalyst adherence | Good | Poor | Good. |

THERMAL STABILITY

*Example II*

| | | | |
|---|---|---|---|
| Catalytic oxide | | $ZnO-Bi_2O_3$ | |
| Support | Brass | Brass | Steel. |
| Adhesive agent | $Na_2CO_3$ | 0 | 0. |
| Per cent conversions at— | | | |
| 400° C. and 1.5 v./v./hr | 90.4 | 98.0 | 96.0. |
| 500° C. and 3.0 v./v./hr | 59.1 | 97.0 | 97.0. |
| Catalyst adherence | Good | Poor | Good. |

CATALYST LIFE

*Example III*

In actual plant operation using $ZnO+6\%$ $Na_2CO_3$ on a brass carrier, converting secondary butyl alcohol to methyl ethyl ketone at 400° C. and 1-3 atmospheres pressure, employing a feed rate of 1.0 v./v./hr., the catalyst is replaced about every 90 days. The average percentage conversion during this period is 80%. During such a run several of the tubes in the reaction chamber plug up due to the fusion of the brass carrier and such tubes must be rebored before being again placed in operation.

In a trial run involving $ZnO+6\%$ $Bi_2O_3$ on brass using no bonding agent and under the conditions outlined above, the catalyst required replacement after only 70 days operation. During the last 10 days of operation the percentage conversion dropped from 90% to 50% and when the converter was opened it was found that several of the tubes contained fused brass.

A tube was then charged with $ZnO+6\%$ $Bi_2O_3$ carried on a steel support made as described in the present application. After 180 days of operation this catalyst was still converting more than 80% of the alcohol to ketone. The experiment was terminated at this time to provide an opportunity to inspect the tube which was found to be free and clear of all indication of fused carrier.

What is claimed is:

1. As a composition of matter, a catalyst bonded on a ferrous metal support by an oxide of iron, said catalyst being a mixture consisting of zinc oxide and 1-6% of bismuth oxide based on the weight of zinc oxide and said catalyst mixture being 3 to 6% by weight of said support.

2. A composition of matter as in claim 1 in which the ferrous metal is cast iron.

3. A composition of matter as in claim 1 in which the ferrous metal is a stainable steel.

4. As a composition of matter, a catalyst bonded on a ferrous metal support by an oxide of iron, said catalyst being a mixture consisting of zinc oxide and 6% bismuth oxide based on the weight of zinc oxide and said catalytic mixture being 3 to 6% by weight of said support.

5. A composition of matter as in claim 4 in which the ferrous metal is stainable steel.

6. A composition of matter as in claim 4 in which the ferrous metal is cast iron.

VINCENT F. MISTRETTA.

REFERENCES CITED

The following references are of record in the file of this patent:

UNITED STATES PATENTS

| Number | Name | Date |
|---|---|---|
| 2,132,613 | Francon | Oct. 11, 1938 |
| 1,903,803 | Barker | Apr. 18, 1933 |
| 1,844,998 | Wietzel et al. | Feb. 16, 1932 |
| 2,357,570 | Adams | Sept. 5, 1944 |
| 1,746,781 | Lazier | Feb. 11, 1930 |
| 2,370,797 | Kearby | Mar. 6, 1945 |

FOREIGN PATENTS

| Number | Country | Date |
|---|---|---|
| 315,818 | Great Britain | Apr. 10, 1930 |